United States Patent Office 3,514,085
Patented May 26, 1970

3,514,085
COMBUSTION CHAMBER ATMOSPHERE CONTROL
Herbert J. Woock, 420 California St.,
Arcadia, Calif. 90052
Continuation-in-part of application Ser. No. 679,718,
Nov. 1, 1967. This application Dec. 9, 1968, Ser.
No. 782,207
Int. Cl. F23n 1/02
U.S. Cl. 263—40    10 Claims

ABSTRACT OF THE DISCLOSURE

An apparatus and method for providing a combustible mixture and control of the combustion chamber atmosphere with ease and accuracy accomplished by varying the quantity of gaseous fuel of known B.t.u. value admixed with a subatmospheric stream of combustion air flowing into a combustion chamber having a flue outlet to the atmosphere and noting when a given adjustment of the gas supply means provides flue gases having the desired analysis. The gas is discharged into a combustion air stream on the suction side of a blower. The combustion chamber may be operated at different heating rates by adjusting the air flow control means to one of a number of positions for each of which there is an associated adjustable fuel flow control means operable to provide the proper fuel flow for any adjusted position of the air flow control valve.

---

This application is a continuation-in-part of my copending application for U.S. Letters Patent, Ser. No. 679,-718, filed Nov. 1, 1967, entitled "Automatic Temperature Control."

This invention relates to combustible mixture control and more particularly to an improved, simplified method and apparatus for providing quickly and with accuracy a desired combustible mixture and more particularly any of a wide range of precise combustion chamber atmospheres.

There are countless applications in industry, the laboratory, and elsewhere having need for heating equipment and controls therefor capable of providing a burner, a heating chamber, or the like with a combustible mixture of thoroughly intermixed constituents. It is also most important in carrying out certain furnace and heating operations to maintain the heating chamber atmosphere rigidly to prescribe specifications along with the capability of quickly and precisely shifting the atmosphere to some other desired constituency. These and the like related conditions are readily achieved utilizing the principles, techniques, and apparatus of this invention and fuel of any B.t.u. content and composition. For example, in space heating applications, maximum heating efficiency is achieved using fuel of a known B.t.u. content and adjusting the air and fuel constituents of the combustible mixture to provide flue gas having a specified percentage of about 5.75 percent of unburned oxygen. Under such conditions it is known that there has been optimum utilization of the B.t.u. content of the fuel accompanied by minimum oxidation damage and heat loss via the flue gases. In an application of this type the controlling criteria is the optimum utilization of the B.t.u. content with minimum excess air.

A second example requiring a distinctively different furnace atmosphere is the heat treatment of metals involving many different metals and alloys. The variables here are diverse, as is indicated by the fact the tolerable excess oxygen content of the flue gas varies over a range including 0.02 percent to 7 and 8 percent on the high side. For example, when treating a metal having a critical carbon content, it is important to avoid reduction of the carbon by limiting the excess oxygen content of the flue gas to a small value. Under other conditions, such as stress relief, an oxygen content of about 5 percent is desirable. If minimizing oxidation is the objective, then the furnace atmosphere should contain a minimum of excess oxygen and this is especially true at higher furnace temperatures.

Still another example of furnace operations where furnace chamber atmosphere is of great importance are operations involving fusings of coatings to a base metal and in hardfacing of steel and other materials. Despite efforts to assure a clean surface on the base metal, some oxidation is usually unavoidable requiring the use of flux. Proper functioning of the flux requires close control of excess oxygen. With too little oxygen, the flux is too slow and an excessive percentage renders the flux action too violent and the metal becomes objectionably porous. The proper percentage of oxygen varies but, with common fluxes, a percentage ranging between 2 and 5 percent produces good results.

This invention contemplates using suction blower means having its suction side connected to the atmosphere and to a source of fuel and its discharge connected to either a single or a plurality of burners. The blower means preferably operates at a constant speed, its discharge side being equipped with throttling means operating to supply a combustible mixture selectively at different rates under the control of sensitive temperature sensing means in the space being heated. According to one preferred arrangement of the invention control, the higher rate combustible mixture is effective to heat the space or substance quickly to a temperature in excess of the heat losses from the space, whereas the lower rate combustible mixture is inadequate to supply the heat losses. The system operates automatically to supply the combustible mixture at the higher rate until the selected temperature is achieved whereupon the system automatically shifts to supply the combustible mixture at the lower rate until the temperature sensing means senses a recession from the selected temperatures whereupon the system resumes supply of the combustible mixture at the higher rate.

To avoid the serious problems heretofore encountered in mixing gaseous fuel and air under differing flow rates and pressures, the present invention utilizes blower means having its discharge connected directly with the furnace burners and its suction inlet connected to the atmosphere. The fuel is introduced into the air on the suction side of the blower. Additionally and importantly, the air and gas are thoroughly intermixed under the highly effective mixing conditions prevailing within the blower means which operates at constant speed. Control over the flow rate of combustible mixture to the burners is provided by regulating valve means on the discharge side of the blower and normally held in either its high or in its low rate position depending upon the heating demand and whether the fuel supply is operating at the high or the low rate. A continuous type gas analyzer is connected to the flue and permits the operator to determine at a glance whether there is either excess or inadequate oxygen for optimum operation for the particular use being made of the equipment. Simple, easily made adjustments can then be made, if necessary, in the gas supply until the gas analyzer indicates high efficiency combustion conditions for that use.

Accordingly, it is a primary object of this invention to provide a simple and highly reliable method and apparatus for forming a readily varied combustible mixture to provide an atmosphere of heated products of combustion of precisely known and readily adjusted constituency.

Another object of the invention is the provision of a furnace and regulatable fuel supply therefor readily adjusted to operate within a desired temperature range and to provide a hot gas atmosphere of accurately known composition including its excess oxygen content.

Another object of the invention is the provision of a furnace suitable for any of many applications and having simple, rugged, easily manipulated means for varying the furnace chamber atmosphere to maintain the heating chamber atmosphere substantially uniform despite abrupt shift in the amount of fuel and air admitted to the combustion chamber.

Another object of the invention is the provision of means for supplying a gaseous fuel mixture to burner means and including suction blower means having its inlet connected to a gaseous fuel source and to an atmospheric air source and utilizing the blower to mix the gas and air intimately while passing therethrough.

Another object of the invention is the provision of an automatic atmosphere control system employing a blower operating at uniform speed having means for regulating the flow discharging therefrom and having its suction air inlet connected to a source of pressurized gaseous fuel.

These and other more specific objects will appear upon reading the following specification and claims and upon considering in connection therewith the attached drawing to which they relate.

Referring now to the drawing in which a preferred embodiment of the invention is illustrated.

Figure 1:
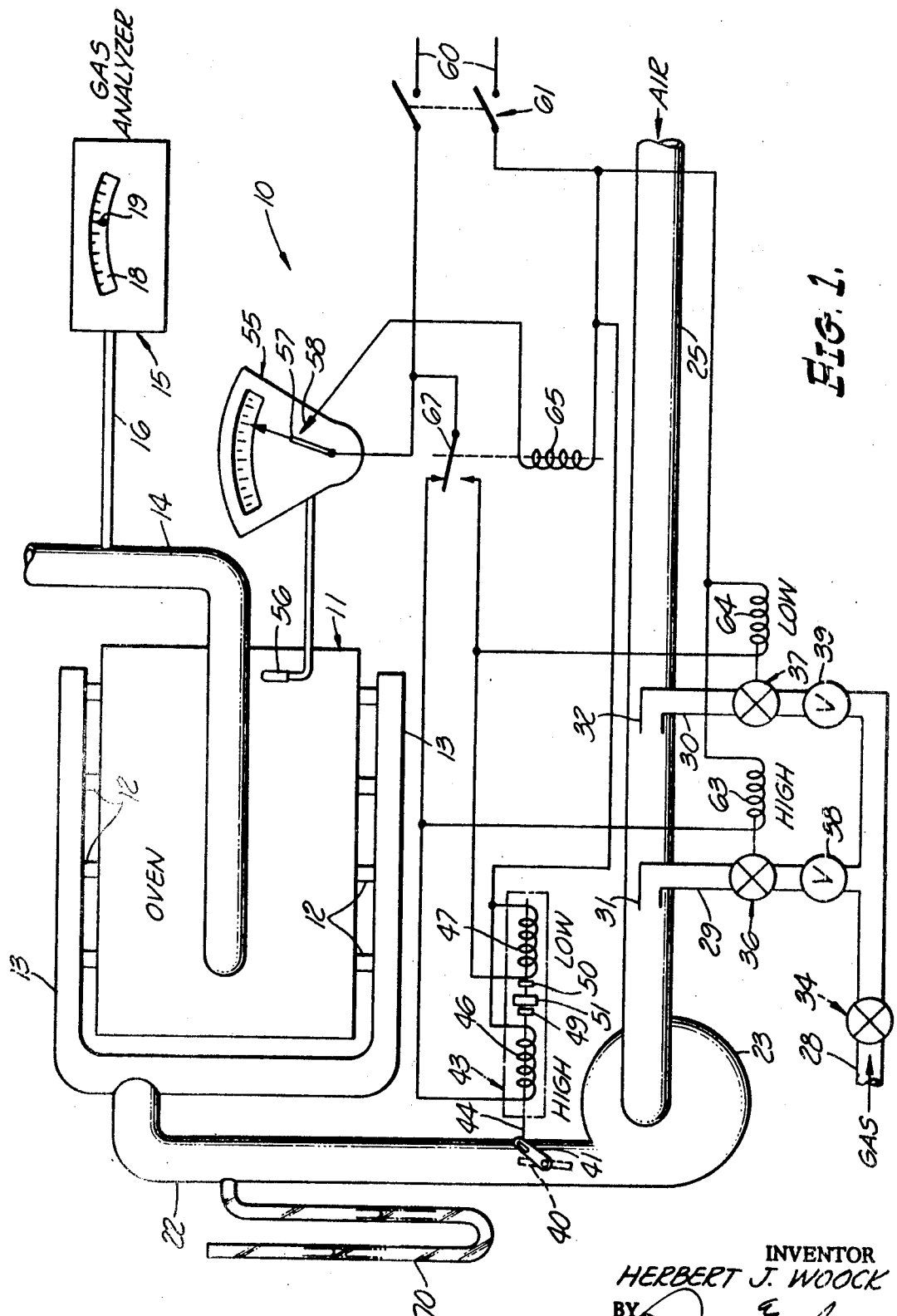
FIG. 1 is a schematic representation of the invention temperature control arranged to supply fuel to one or more burners heating an oven.

Referring to the drawings, there is schematically represented one preferred embodiment of the invention temperature control system designated generally 10 as employed to heat an oven or furnace 11. By way of example, let it be assumed that it is desired to maintain the space within this oven at a temperature of 2050 degrees F. to fuse a layer of hardfacing to a metallic article of manufacture. In this and numerous like operations it is most important that the temperature within the heated chamber be held as precisely as is possible to a selected value since a temperature in excess of the selected value results in softening of the article being coated to an undesirable degree, warpage and other undesirable effects, whereas temperatures below the critical temperature necessary for fusion of the coating and the base metal will result in failure. In either event, an imperfect result is produced and the article must be rejected. Additionally, the attainment of uniform and effective results is dependent upon maintaining atmospheric conditions within the oven as constant as possible.

Figure 2:
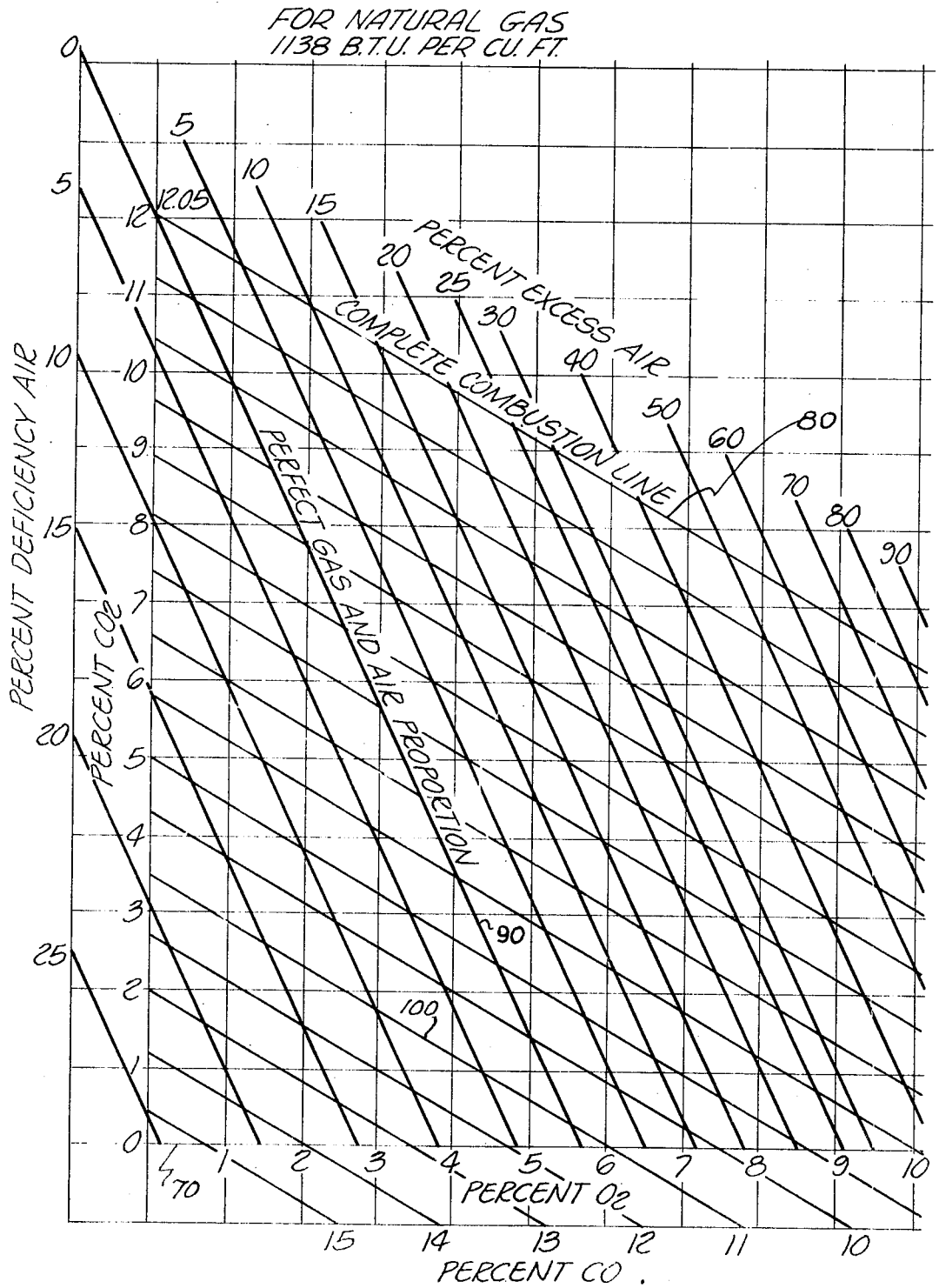
FIG. 2 is an Ostwald chart for natural gas of a particular constituency and useful in checking combustion by flue gas analysis.

It will be understood that oven 11 is of the type having a multiplicity of suitable burners mounted in its walls. Only the positions of a few of the burners is indicated schematically in the drawing, the inner ends of these burners opening into the interior of the oven chamber and outer ends being supplied with a combustible mixture via supply pipes 12 in communication with a manifold 13. The products of combustion discharge to the atmosphere from the oven through a flue 14. A continuous gas analyzer 15 has a probe or sampling tube connected to the flue via conduit 16 and is provided with a scale 18 co-operating with a pointer 19 to indicate to the observer the excess oxygen constituent of the furnace atmosphere. This simple type of gas analyzer suffices when utilizing the principles of this invention. For example, natural gas having the following typical analysis:

| | Percent |
|---|---|
| $CH_4$ | 81.5 |
| $C_2H_6$ | 17.0 |
| $N_2$ | 1.5 | has a B.t.u. content per cubic foot of 1138. An Ostwald chart useful in checking combustion of this gas by means of gas analyzer 15 is shown in FIG. 2, it merely being necessary to analyze for the percentage of oxygen present in the flue gas. The percentage of carbon dioxide is readily determined. For example, let it be assumed that the analyzer shows an oxygen content of 6 percent. The Ostwald chart shows that the vertical line through the 6 percent oxygen point intersects the upper inclined margin line 80 at the 8.65 $CO_2$ line. The steeply inclined lines 90 represent the percent of air present in the furnace chamber, either as excess or deficient air, whereas the less steeply inclined lines 100 represent percentage of carbon monoxide. However, it will be understood that normally there is no monoxide if there is excess oxygen present. It will be further understood that each type and composition of fuel has its own characteristic B.t.u. content and its own Ostwald chart corresponding in a general way with that shown in FIG. 2 but differing in detail, as is well known to those skilled in the construction and use of such charts. This information suffices to inform the observer whether the gas and air ratio is properly balanced to provide the most favorable atmosphere and/or the most efficient combustion for the particular operation being carried out with the furnace and the described atmosphere control system.

The combustible mixture is supplied to the manifold 13 via a duct 22 in communication with the outlet of centrifugal or the like blower means 23 driven by a motor, not shown. Opening into the suction side of blower means 23 is a duct 25 in communication with a clean supply of atmospheric air.

Fuel gas is introduced into inlet air duct 25 from a supply main 28 via ducts 29, 30 arranged in parallel with one another and each having an outlet 31, 32 discharging axially downstream of duct 25. Supply conduit 28 is provided with a master cutoff valve 34 which is fully open so long as the system is in operation. Branch ducts 29, 30 are provided with respective solenoid operated valves 36, 37 designed to close under spring pressure or gravity when de-energized. On the supply side of these valves is an associated manually adjustable regulating valve 38, 39 by which the flow rate can be finely regulated, it being understood that solenoid valves 36, 37 perform no flow regulating function but, when open, merely freely passing gas flowing past regulating valves 38, 39.

The means for regulating the rate of combustible mixture flow discharging from blower 23 is here shown as comprising a butterfly valve 40 mounted crosswise of duct 22 and movable between its operating positions by an operating arm 41 having a lost motion connection with one end of a motor represented generally at 43. It will be understood that any suitable operator may be employed to move valve 40 between its two operating positions in one of which the combustible mixture is supplied to the burners at a high rate and in the other of which it is supplied a a substantially lower rate.

By way of examle, operator 43 may comprise a hydraulic cylinder movable between a selected pair of operating positions under the control of electrically controlled valve means well known to those skilled in the art. Alternatively and as herein shown, operator 43 comprises two solenoids 46, 47 having an armature 44 operatively connected to arm 41 and movable to and fro between two stationary positions depending upon which of coils 46, 47 is energized. The armature 44 is provided with a pair of separately adjustable stops 49, 50 positioned on the opposite sides of a fixed stop 51 to limit the travel of the armature in each direction. When coil 46 is energized armature 44 will be shifted until adjustable stop 49 abuts fixed stop 51. In this position, the butterfly valve 40 will be positioned to supply the combustible mixture to the burner at a high rate. When coil 47 is energized, armature 44 is shifted to rotate valve 40 counter clockwise to restrict the combustible mixture flow to the low rate.

Control of the operation of solenoid means 46, 47 is initiated by a pyrometer 55 having a temperature sensor 56 within the oven and connected to energize the pyrometer in a well known manner. The pyrometer may be provided with either a single or a double pair of contacts arranged to complete an electrical circuit to the gas valves and to solenoids 46, 47 as the temperature attains and recedes from a selected value. As here shown, the pyrometer has a single adjustable contact 58 positioned to be contacted by the pyrometer pointer 57 when the oven chamber reaches a selected temperature level, such as 2050 degrees F.

The control circuit is energized from a power supply 60 through a master switch 61, one side of the line being connected to the pyrometer pointer and the other to coils 63, 64 of solenoid valve 36, 37. The pyrometer contact is connected in circuit with a power relay 65 which, when de-energized, has its contact 67 closed in the position shown in the drawing. When energized, the relay closes downwardly and energizes coils 47 and 64. Operation of the described temperature control system is as follows, it being pointed out that the furnace is preferably provided with a pilot burner, not shown. To start the system in operation, switch 61 is closed and the blower motor, not shown, comes up to speed. Thereafter, master gas valve 34 is opened and, the furnace being cold, power relay contact 67 will be closed upwardly as shown, butterfly valve 40 will be in its high position and solenoid valve 63 will be energized and in open position. Accordingly, blower 23 will induce a flow of gas and air under sub-atmospheric pressure into the blower inlet where these components are thoroughly intermixed before entering duct 22 for flow through manifold 13 to the burners where the gas mixture is ignited by the pilots and burns to supply heat to the oven.

The operator observes the air pressure prevailing in the mixture supply duct 22 by reading manometer 70 and closely observes gas analyzer 15 to determine whether the desired air-gas combustion mixture is being supplied to the burners and whether complete combustion of the fuel is taking place. If the combustion is occurring at high efficiency for a hardfacing operation, the gas analyzer should indicate a $CO_2$ oxidizing content in the flue gas of approximately 10 percent. If there is a different reading, then the operator adjusts gas regulator valve 38 in the proper direction and as necessary to obtain an excess oxygen reading of about 3.6 percent. It is then known from the Ostwald chart that the carbon dioxide content of the furnace chamber is 10 percent.

When the oven temperature reaches the selected limit, point 57 of the pyrometer engages contact 58 thereby energizing relay 65 and closing its contact 67 downwardly to energize only coils 47 and 64. Solenoid gas valve 36 then closes as valve 37 opens. The energization of coil 47 shifts butterfly valve 40 to partially close the latter and reduce the flow of the combustible mixture to the burners. The operator then carefully observes the gas analyzer to make certain that the desired atmosphere of 3.6 percent excess oxygen and 10 percent carbon monoxide is present in the oven at the lower heating rate. If it is not, then adjustments are made in valve 39 until the desired atmosphere prevails in the oven.

The burning of the combustible mixture supplied at the lower rate just described is preferably inadequate to counteract normal heat losses from the oven with the result that after a brief period of operation at this lower rate the oven temperature will fall. A drop of 10 or 15 degrees F. is adequate to move the pyrometer pointer 57 away from contact 58 thereby opening the circuit to power relay 65. Instantly this occurs, coils 47, 64 are de-energized and coils 46, 63 are energized thereby restoring the supply of the combustible mixture to burners at the high rate. If the control system is being used to control a furnace or other appliance subject to large or sudden changes in the heat load as, for example, a furnace opened periodically to discharge hot goods and to receive cold goods, it is desirable to supply the combustible mixture at a high rate sufficiently adequate to restore the furnace operating temperature quickly and then to reduce the heating rate sufficiently to avoid overshoot. This is accomplished by supplying the combustible mixture at a low rate incapable of counteracting heat losses. In practice and typically, the low rate can be selected within the range of 5 to 70 percent of the high rate.

The described control system continues to operate in this manner and is highly effective in maintaining the oven temperature and atmosphere substantially constant utilizing a minimum number of simple, rugged components. If the heat load changes abruptly, the temperature control responds quickly and smoothly to the changed conditions with a minimum temperature change and without risk of the temperature rising above the selected value. A minimum of attention and surveillance is required of an operator. It will also be understood that the position of the pyrometer contact 58 may be readily changed to any position within the operating range of the pyrometer and the associated equipment.

Resetting the control to operate the furnace chamber with a different atmosphere merely involves adjusting the fuel valves and noting the change in the oxygen content of the flue gas. In this connection, it is, of course, important to adjust each of the valves 38, 39 until the same atmosphere is obtained at each combustion rate and then locking the controls in the correct adjusted position.

While the particular combustion chamber atmosphere control herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That method of operating a furnace to maintain a uniform atmosphere therein of a desired constituency which method comprises: supplying combustion air to a furnace along a duct having a blower between its opposite ends operating at uniform speed, admitting fuel into air entering the inlet side of said blower at a plurality of different rates, and shifting abruptly from one rate to another by changing the rate of air flow on the discharge side of said blower and substantially concurrently changing the rate of fuel supply delivered to the inlet side of said blower to a rate matched with the changed rate of air flow thereby to provide a constant-ratio combustible mixture of fuel and air to said furnace effective to produce products of combustion having the same relative consistency as when the furnace is operating at a different one of said plurality of rates.

2. That method defined in claim 1 characterized in the step of analyzing the atmosphere within the furnace chamber and changing said constant-ratio fuel and air combustible mixture supplied to the furnace via said blower to a different constant-ratio fuel and air combustible mixture to provide a desired different analysis of the products of combustion therein.

3. That method defined in claim 1 characterized in the step of selectively adjusting said one of said air flow and associated fuel flow rates as necessary and appropriate to provide a desired relative consistency in the constituents of the products of combustion produced in the furnace.

4. That method defined in claim 1 characterized in the step of compensating for a detected departure from a desired relative consistency in the constituents of the products of combustion produced at any one of said plurality of combustion rates by varying in the appropriate direction the rate of flow of fuel into air entering the suction side of said blower and noting when analysis of the combustion products discloses resumption of the desired relative consistency between the constituents thereof, and retaining uniform the rate of fuel flow found to provide said desired relative consistency in the constituents of the products of combustion.

5. That method defined in claim 1 characterized in that said fuel is natural gas having any of a wide range of B.t.u. content.

6. That method defined in claim 1 characterized in utilizing said blower to thoroughly intermix the fuel and air while passing therethrough thereby assuring the delivery of a stream of combustible mixture to said furnace in immediate readiness for highly uniform and efficient combustion.

7. That method of operating a furnace equipped with gaseous fuel burner means connected to the discharge side of suction blower means having its suction side in communication with the atmosphere, discharging gaseous fuel into an air stream entering the suction side of said blower means at a rate so related to the air flow through said blower means as to provide a highly efficient combustible mixture, utilizing said blower means to thoroughly mix the gaseous fuel and air while passing through said blower means enroute to the burner means, and varying the rate of gaseous fuel flow and of air flow through said blower means in the same relative ratio while operating said blower means at the same uniform speed as previously thereby to vary the quantity of the combustible mixture delivered to the burner means.

8. That method defined in claim 7 characterized in the step of operating said blower means at substantially uniform speed and throttling the air and gas flow through said blower means between a high rate and a low rate with the low rate ranging between 5 and 70 percent of the high rate and so that the gas-air ratio remains substantially uniform for all flow rates.

9. Heating apparatus operable to provide and burn a combustible mixture of fuel and air in a manner to maintain a desired atmosphere of products of combustion in said apparatus, said apparatus having means forming a heating chamber vented to the atmosphere by way of a flue, a combustible mixture supply duct opening into burner means in said heating chamber, blower means operable at uniform speed connected between the air entrance end of said supply duct and said burner means, means for supplying fuel into said supply duct along the end thereof entering the inlet side of said blower means, and said fuel supply means including adjustable valve means in said duct means on the discharge side of said blower means adjustable to operate in a plurality of predetermined positions for supplying fuel into air entering the inlet of said blower means at a plurality of rates each so related to a selected one only of said air flow rates as to provide products of combustion having substantially the same relative consistency for each position of said adjustable air valve means and of said gas supply means, and means for shifting said air valve means and said fuel supply means in unison to maintain uniform the relative consistency between the constituents of the products of combustion.

10. Heating apparatus as defined in claim 9 characterized in the provision of means for analyzing the products of combustion for oxygen and displaying the result for viewing by a person adjusting the supply of fuel into air entering the inlet of said blower means.

References Cited

UNITED STATES PATENTS

| 1,753,319 | 4/1930 | Schofield et al. | 431—76 X |
|-----------|--------|------------------|----------|
| 2,324,821 | 7/1943 | Campbell | 431—76 X |
| 2,335,471 | 11/1943 | Ashcraft. | |
| 2,517,869 | 8/1950 | Grapp | 263—40 |
| 3,049,300 | 8/1962 | Lewis et al. | 431—76 |
| 3,074,644 | 1/1963 | Geniesse | 236—15 |

WILLIAM E. WAYNER, Primary Examiner

U.S. Cl. X.R.

431—76